Oct. 29, 1968 G. H. TABBERT 3,407,592
SHIFT LINKAGE ASSEMBLY FOR A WHEELED VEHICLE
Filed Oct. 14, 1966 3 Sheets-Sheet 1

INVENTOR.
GENE H. TABBERT
BY
ATTORNEYS

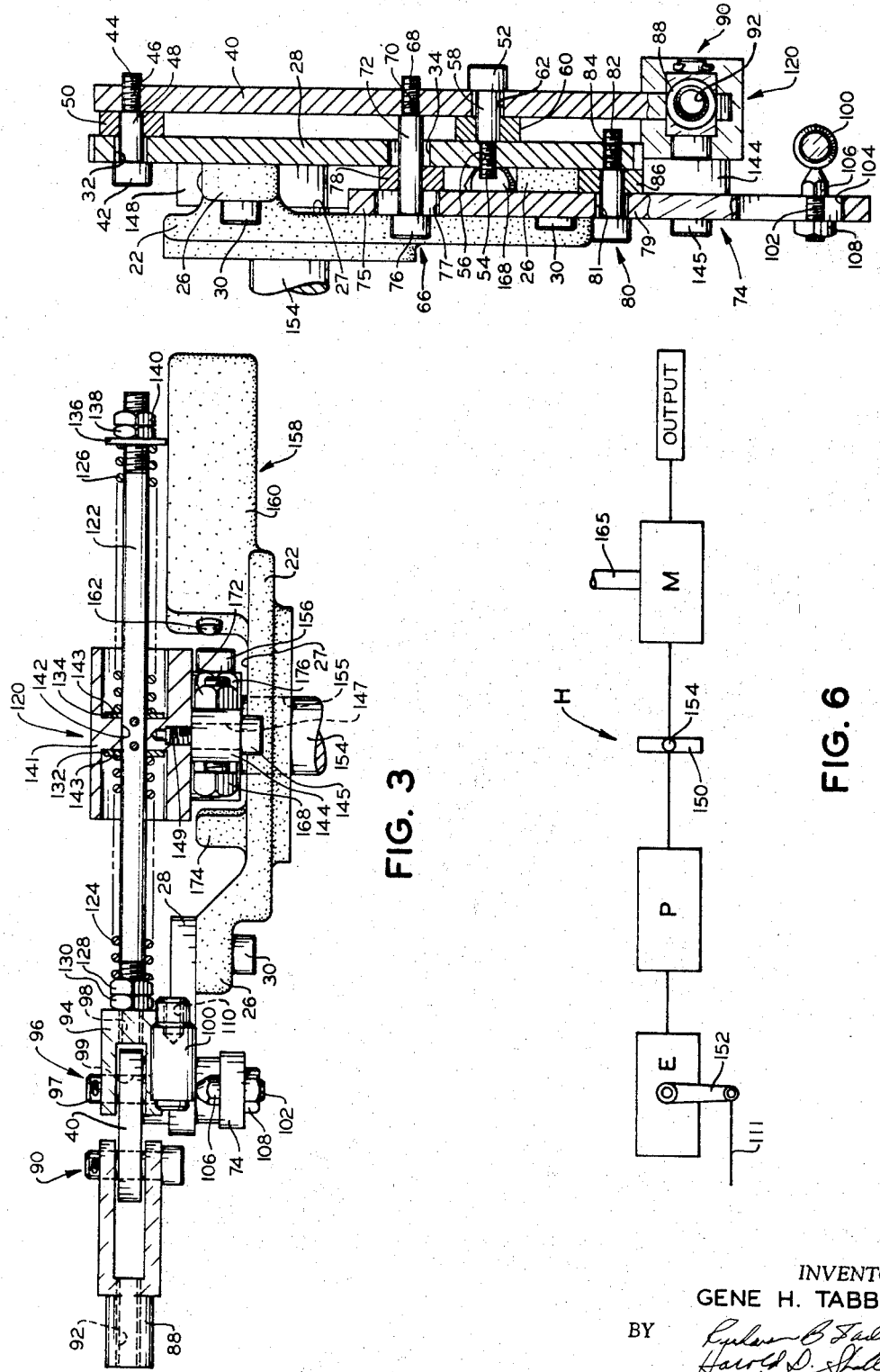

INVENTOR.
GENE H. TABBERT
ATTORNEYS

United States Patent Office 3,407,592
Patented Oct. 29, 1968

3,407,592
SHIFT LINKAGE ASSEMBLY FOR A WHEELED VEHICLE
Gene H. Tabbert, Toledo, Ohio, assignor to Dana Corporation, Toledo, Ohio, a corporation of Virginia
Filed Oct. 14, 1966, Ser. No. 586,864
11 Claims. (Cl. 60—19)

ABSTRACT OF THE DISCLOSURE

A shift linkage assembly including a pair of pivoting links, the first of which is operative to drivingly move a swash plate of a hydrostatic transmission to place it in forward or reverse drive and the second of which is operative to increase the throttle setting of the engine driving the hydrostatic transmission. The arrangement is such that the second link is actuated into a throttle advancing position by movement of the first link into either forward or reverse drive directions. A resilient overriding means is included to insure that anti-stall characteristics are imparted to the hydrostatic transmission.

This invention relates to a control arrangement for a hydraulic drive and more specifically to a control arrangement having a single operator actuating lever for an engine throttle and hydrostatic transmission for use in wheeled vehicles such as garden tractors, golf carts, or the like.

Although various control arrangements have heretofore been utilized for control of a hydraulic drive and prime mover connected thereto and such arrangements have included hydrostatic transmissions, these control arrangements require a multiplicity of actuating levers or an extremely complicated linkage for both hydraulic and throttle control since these systems are required to both provide movement of the swash plate for forward and reverse operation of the vehicle and also to provide advance or retard of the throttle lever on the prime mover. Further, even in these rather complex control arrangements, heretofore no satisfactory operating positive arrangement to override the manually actuated swash plate control to prevent stalling of the vehicle when under heavy load (e.g., when the vehicle is traversing steep knolls or hills) has been developed which provides override at the control linkage itself and thereof necessitates no feedback or controlled leakage in the hydrostatic transmission itself.

Thus, it would be very advantageous if a simple control arrangement, requiring only a single operator actuated lever, was provided which yielded forward and reverse movement of the hydrostatic transmission and advance and retard of the throttle, and, at the same time, positive overriding of this control arrangement to prevent stalling of the vehicle. The use of such a system would enable the operator to control by a single foot or hand the operation of the entire vehicle save for steering and at the same time insure safe and steady starting or steady acceleration due to the absence of the opening and closing of a leakage control valve or the like.

Accordingly, it is an object of this invention to provide a simplified combined control system operative by a single operator lever to place a vehicle in forward and reverse drive and at the same time control the advance or retard of the vehicle throttle setting.

It is an additional object of this invention to provide means for overriding the manual setting of the swash plate provided by the operator lever to prevent stalling of the vehicle under heavy load condition.

It is a further object of this invention to provide a link means control arrangement which advances the vehicle throttle lever in the same direction independently of movement of the operator lever in placing the hydrostatic transmission in forward or reverse drive.

It is a further object of the invention to provide a linkage arrangement control means which positively moves the swash plate to forward or reverse drive relationship through a single operator lever.

In furtherance of the foregoing objects, the invention is provided with a pair of pivoting links, the first of which is attached to the operator lever through some suitable connecting means at one side and also is attached at its other side to the drive mechanism for the swash plate. The second link is pivotally attached to the first link intermediate its ends and also, adjacent its end, to the vehicle throttle through any suitable driven means. A pair of pivots provide centers of rotation for the first link to insure movement thereof in opposite directions (clockwise and counterclockwise) dependent upon the direction of operator lever movement and thereby proper movement of the swash plate between forward and reverse drive positions. The second link, because of its pivotal connection with the first link and the two centers of rotation of the first link, always moves in the same direction (clockwise) independent of whether the operator lever is being advanced into forward or reverse. A hydraulic means which senses increased pressure (increased load) in the hydrostatic transmission tends to move the swash plate in a direction to reduce the volume of flow from the pump and thereby prevent stalling. Overriding spring means situated on the drive member permits increasing movement of the swash plate by the hydraulic means upon increasing pressure and prevents this movement from being transmitted to the first and second links and therefrom to the operator lever.

Further and additional objects and advantages of the instant invention will be had from the detailed description following and the drawings appended thereto wherein:

FIG. 2 is a view of the control arrangement with the throttle lever removed, taken generally on line 2—2 of FIG. 1 but showing some of the elements partially in cross-section to increase the clarity of the showing thereof;

FIG. 3 is a bottom plan view of the control arrangement of FIG. 1 with the throttle lever and control cable removed;

FIG. 6 is a view showing schematically the hydrostatic transmission, engine and connection to the control arrangement.

Figure 1:
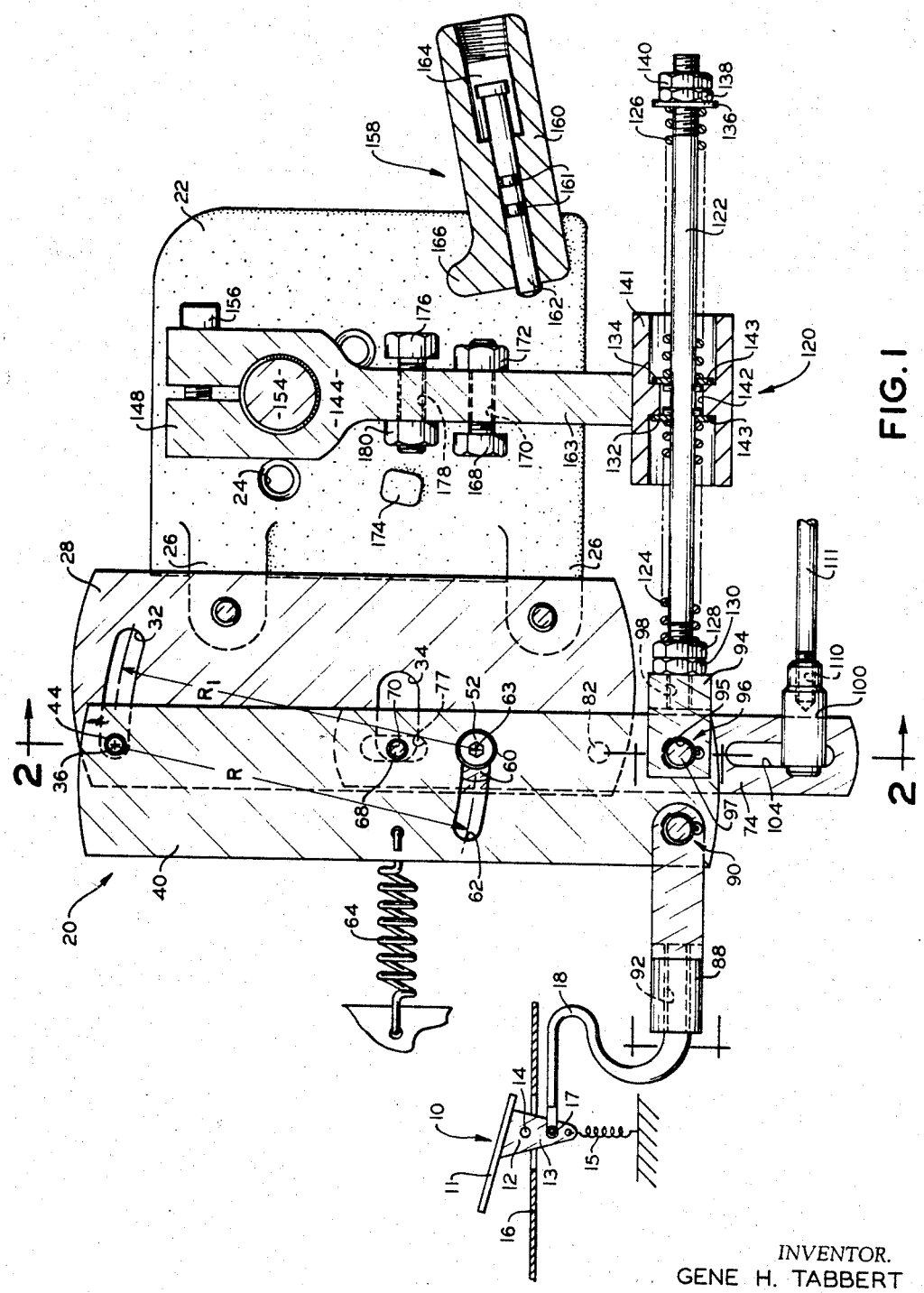
FIG. 1 is a view in elevation and partly broken away of the control arrangement in neutral position and removed from the transmission but showing its attachment to the throttle lever.

Referring now to FIGS. 1 and 3 for a better understanding of the invention, therein is shown an operator lever 10 which is preferably situated adjacent a vehicle floor 16 for foot actuation by a vehicle operator but may, if desired, be situated conveniently for manual actuation by an operator of the vehicle. The operator lever 10 includes a pedal 11 having a bracket 12 fixed rigid thereto with the bracket disposed immediate the ends of the pedal 11. The bracket 12 is provided with a depending portion 13 so as to provide a mounting means for pivot 14 fixed to the floor 16. By this arrangement, the pedal 11 of the operator lever 10 when actuated may easily pivot in a clockwise or counterclockwise direction. A return spring 15 insures that the operator lever 10 is continuously urged to its intermediate or neutral position.

Depending portion 13 of operator lever 10 extends substantially below the pivot 14 so as to be disposed beneath the floor 16 and thereby provide a suitable connection 17 for a Bowden wire cable 18 or the like. The cable 18 transmits pedal motion to a linkage assembly 20 and may be suitably attached to the vehicle at several positions (not shown) between the operating lever 10 and the linkage assembly 20 so as to insure that clockwise or counterclockwise movement of the lever 10 will be transmitted dirtctly to the linkage assembly 20 as a reciprocating motion.

The linkage assembly 20 is mounted on a housing of a hydrostatic transmission (not shown) by a mounting plate 22 having a series of bores 24 therethrough for the easy insertion of transmission housing attaching bolts (not shown). The mounting plate 22 includes a pair of leftwardly extending ears 26 to provide easy connection for a slotted plate 28 that is utilized to mount the moving links of the linkage assembly 20. As can be best seen in FIG. 3, the ears 26 are offset angularly and axially relative to the extending middle portion 27 of the mounting plate so as to prevent interference between it and the moving elements of the linkage assembly 20. A pair of vertically aligned bolts 30 extend through the ears 26 of the mounting plate and are threadedly received in the slotted plate 28 of the linkage assembly 20 to fix these two members relative to each other. The slotted plate 28 also extends leftwardly so as to be disposed beyond the mounting plate 22 and has adjacent its leftward end the terminus of a pair of slots 32 and 34, each of which extend rightwardly from its terminus, the slot 32 in an arcuate manner and the slot 34 in a slightly angled manner. The slot 32, as will later be described, serves as a guiding slot and the slot 34 as a clearance slot.

A first or upper link 40 is pivotally and slidably attached at its upper end to the upper portion of the mounting plate 22 by a shoulder bolt 42 which is received loosely in the slot 32 in the mounting plate, the width of the slot being greater than the major diameter of the shouldered bolt 42. The shouldered bolt includes a threaded portion 44 for fixed attachment to the upper link 40 by insertion in a threaded aperture 46 therein and a shoulder 48 formed on the shouldered bolt for spacing the link 40 from the slotted plate 28 adjacent their upper ends. A washer 50 mounted on the bolt provides an additional bearing surface and means to space and align the upper link 40 and slotted plate 28.

The upper link 40 is provided with a second shouldered bolt 52 oppositely disposed relative to the bolt 42 so that a threaded portion 54 of the shouldered bolt 52 may be inserted in a threaded aperture 56 in the slotted plate 28 to fix the second shouldered bolt relative to the slotted plate. As with the first shouldered bolt 42, a shoulder portion 58 on the bolt 52 and a washer 60 space and align the slotted plate 28 and upper link 40 at their lower ends.

The bolt 52 is mounted in a guiding slot 62 extending arcuately in the link 40, the arc of the slot 62 generated by a radius R of a circle having as its center the center of the leftward terminus 36 of the slot 32 (the center of the bolt 42) while the arc of the slot 32 is generated by a radius $R_1$ of a circle having as its center the center of a rightward terminus 63 of the slot 62 (the center of the bolt 52). Thus, the link 40 is free to pivot relative to the slotted plate 28 on a pivot formed by the bolt 42 while the bolt 52 moves along and is guided by the slot 62. This movement occurs when the pedal 11 is actuated counterclockwise to place the transmission in forward drive.

A spring 64 is attached remotely to some convenient location on the transmission housing at one of its ends and is attached at its other end to the first link 40 at a position substantially mediate the location of the shouldered bolts 42 and 52. This spring urges the upper link 40 leftwardly (FIG. 1) and insures positioning of the shouldered bolt 42 in the leftward terminus 36 of the slot 32 during the aforementioned counterclockwise pivoting movement of the upper link.

In a similar manner, when the operator lever 10 is actuated in a clockwise direction the upper link 40 pivots in a clockwise direction about the pivot formed by the shouldered bolt 52 while the shouldered bolt 42 freely moves along the slot 32 guiding the upper end of the first link 40 in its turning movement with the spring 64 insuring that the bolt 52 remains in the rightward terminus 63 of the slot 62 during this turning movement.

A third shouldered bolt 66 is also provided between the slotted plate 28 and the first or upper link 40. The shouldered bolt 66 is of substantially longer length than the bolts 42 and 52 but, as the shouldered bolt 42, is provided with a threaded portion 68 which screwingly attaches in a threaded aperture 70 in the first link 40. The bolt 66 includes a shoulder portion 72 that passes through slot 34 in slotted plate 28 with the said slot angularly disposed and of sufficient width to accommodate arcuate movement of the shouldered bolt 66 on either of the radii R or $R_1$. Thus, the bolt 66 is driven in its movement by clockwise or counterclockwise movement of the link 40 about the pivots formed by shouldered bolts 66 or 42, respectively, to drive a second or lower link 74 to which it is attached.

The second or lower link 74 has an upper end 75 disposed substantially mediate the vertical height of the first link 40 so that the third shouldered bolt 66 extends through an aperture 77 in the second link with the head 76 of the bolt abutting the opposite face of the link 74. A washer 78 is disposed between the lower link 74 and the slotted plate 28 to space the upper end 75 of the link 74 from the slotted plate 28.

Situated approximately at the lower end 79 of the slotted plate is a fourth shouldered bolt 80 serving as a fixed pivot for the link 74. This bolt extends loosely through an aperture 81 in the second link 74 and is of the same length as the bolts 42 and 52 and is also provided with threaded portion 82, this portion extending into a threaded aperture 84 in the slotted plate 28 so that the shouldered bolt 80 serves as a fixed pivot for the lower link 74. A washer 86 is mounted on this bolt between the link 74 and slotted plate 28 to serve as a bearing and spacing means for the lower portion of the link 74.

Means is provided to connect the linkage 20 to the Bowden cable 18 which means comprises a clevis member 88 attached by a cotter pin and clevis pin assembly 90 to the upper link 40 of the linkage 20. This connection is made adjacent the lower portion of the link 40 with a cotter pin and clevis pin assembly 90 providing a pivot for the clevis member 88. An internal threaded portion 92 at the leftward end of the clevis member provides a convenient and easy attachment of the Bowden cable 18.

Means is also provided attached to the linkage 20 for actuating a swash plate 150 (FIG. 6). More specifically, a rod end member 94 having an aperture 95 therethrough is pivotally attached to the lower portion of one side of the first link by a clevis pin and cotter pin assembly 96, with the bolt 97 of the assembly passing through an aperture 99 in upper link 40. This rod end member is generally cylindrical in shape and has an internal threaded end portion 98 for connection to a drive means 120 extending rightwardly therefrom (to be later described). The clevis pin and cotter pin assemblies 90 and 96 are horizontally aligned in the neutral position of the transmission so as to provide a substantially direct thrust from the clevis member 88 to the rod end member 94.

Means is also provided attached to the linkage 20 for actuating a throttle lever 152 (FIG. 6) and includes a fitting 100 having a threaded end 102 extending through a vertical slot 104 in the second link 74. A shoulder 106 on the fitting 100 and a threaded nut 108 provide, with the threaded end 102 on the fitting 100, a pivotal connection between the fitting 100 and the second link 74. This fitting also includes an internal threaded end portion 110 which provides convenient connection for a rightwardly extending throttle actuating rod 111. It should be noted that the slot 104 along with the fitting 100 provides a means so that the rod 111 may be adjusted vertically on the link 74 to provide a varying length of travel of the throttle rod 111.

Figure 4:
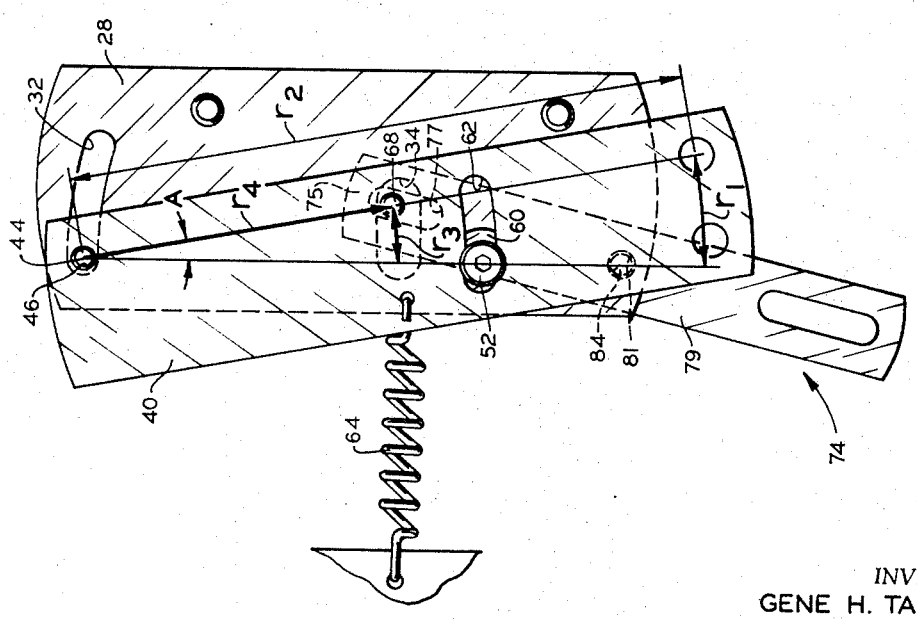
FIG. 4 is a view of the control linkage in forward position.

The operation of the linkage assembly 20 and associated parts is now given. When the operator lever 10 is pivoted counterclockwise from the FIG. 1 position to move the swash plate 150 from neutral to forward drive position (FIG. 4) a rightward thrust is imparted to the clevis member 88. The upper link 40 moves counterclockwise about the pivot formed by shoulder bolt 42 situated in the leftward terminus 36 of slot 32. This bolt position is maintained due to the force exerted by the urging spring 64 which urges the linkage 20 into neutral drive position. The counterclockwise movement of link 40 carries shouldered bolt 66 attached to link 40 rightwardly along slot 34 in slotted plate 28. Shoulder bolt 52 held stationary relative to upper link 40 by slotted plate 28 is also free to move along slot 62 in the upper link to thereby guide it in its movement.

Since the lower link 74 is fixedly pivoted to slotted plate 28 by shouldered bolt 80 and such pivot position is below moving shouldered bolt 66, the lower link 74 is driven clockwise by shouldered bolt 66 relative to the slotted plate 28 and the first link 40. Thus, movement of the operator lever 10 into forward from neutral drive position provides a rightward thrust to the rod end 94 and driving means 120 and a leftward thrust (throttle advance direction) to the fitting 100 and throttle rod 111.

Movement to the linkage assembly 20 from neutral (FIG. 1) to reverse drive position (FIG. 5) will now be described. In order to place the hydrostatic transmission in reverse the operator lever 10 is rotated clockwise from its neutral position imparting a leftward thrust to clevis member 88 and rotating upper link 40 clockwise about the pivot furnished by the shouldered bolt 52 which is maintained in the rightward terminus of slot 62 due to urging spring 64 and the bottoming of shoulder bolt 42 in the leftward terminus of its respective slot. Shoulder bolt 42, carried by the upper portion of link 40, moves downwardly along the slot 32 in slotted plate 28 to guide this end of the link while shoulder bolt 66, fixed to upper link 40, is driven along slot 34 in slotted plate 28. Since the lower link 74 is fixedly pivoted relative to the slotted plate 28 by shouldered bolt 80 and since it is urged in a driving pivoting movement only by shoulder bolt 66 which is moving rightwardly during the clockwise movement of upper link 40, there occurs a clockwise pivotal movement of the lower link 74 relative to the slotted plate 28. Thus, movement of the operator lever 10 into reverse drive from neutral provides a leftward thrust to the rod end 94 and driving means 120 and also a leftward thrust (throttle advance direction) to the fitting 100 and throttle rod 111.

Because of the ratios of the swing radii of the various elements of the linkage 20 and the centers of these swing radii, movement of the upper link 40 in a clockwise-counterclockwise direction, as just described, occasions movement of the lower link 74 only in a clockwise throttle advance direction. Additionally, the geometric relationship of the pivot centers of the linkage 20 also provides less travel for the link 74 when the operator lever 10 is moved to place the hydraulic transmission in reverse direction than when moved to place the transmission in forward drive. More specifically, referring to FIG. 4, the included angle of rotation of the link 74 for any given movement of the upper link 40 is substantially a function of the tangent of the angle A through which the link 40 and shouldered bolt 66 swing. It can be seen in FIG. 4 that the tangent of the angle A is equal to substantially the distance represented by the arc radius $r_1$ at the lower end of link 40 divided by the swing radius $r_2$ and that this same tangent of the angle A can also be represented by the distance $r_3$ shouldered bolt 66 swings through divided by the swing radius $r_4$ of the shouldered bolt 66.

Figure 5:
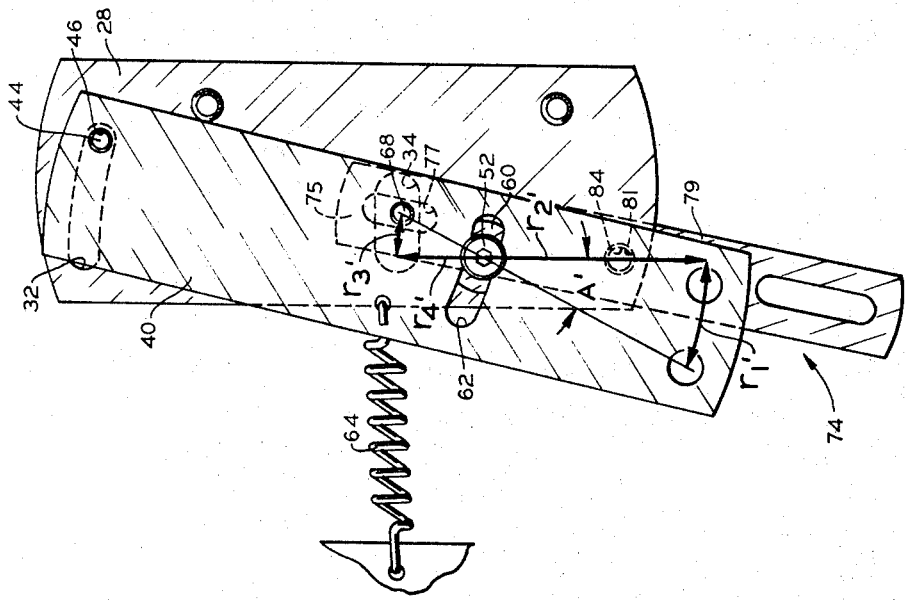
FIG. 5 is a view of the control linkage in reverse position.

Referring to FIG. 5, the included angle of rotation of the link 74 for any given rotation of the link 40 is substantially a function in the tangent of the angle A' through which the link 40 and the shouldered bolt 66 swing. The tangent of the angle A' in FIG. 5 is equal to the arc radius $r_1'$ of the upper link 40 divided by the swing radius $r_2'$ of the link 40. The tangent of this angle A' can also be represented by the distance $r_3'$ that shouldered bolt 66 swings divided by the swing radius $r_4'$ of the shouldered bolt 66.

If the swing arc radius of upper link 40 is assumed equal, then the arc radii $r_1$ and $r_1'$ are equal and the proper geometrical selection of $r_2$, $r_2'$, $r_4$, and $r_4'$ will provide the foregoing function of less throttle travel in reverse drive. A typical example of the proper dimensioning of the various radii (and these proportions are used in the instant invention) is now given. Assuming that $r_1$ and $r_1'$ are set equal to an inch, then if $r_2$ is set at 5.6", $r_2'$ set at 2", $r_4$ set at 2.85", and $r_4'$ set at 0.75", the theoretical movement of pin 66 represented by $r_3$ and $r_3'$ equals 0.51" and 0.375" respectively. Thus, for the same amount of pedal travel, greater acceleration (i.e. fuller throttle opening) is obtained when the vehicle is placed in forward drive.

The remainder of the invention will now be described. Driving means 120 takes the form of a rod 122 that extends rightwardly from the upper link 40 and clevis member 88 below but offset from the mounting plate 22 and includes a pair of springs 124 and 126 mounted in compressed position on the rod 122. Adjacent the leftward end of rod 122 the spring 124 abuts against a nut 128 threadedly received on the rod, this nut being held in position by a jam nut 130 also threadedly received on the rod and abutting the nut 128. The opposite or rightward end of spring 124 abuts against one face of a washer 132. The spring 126 at its leftward end also abuts against one face of a washer 134 and extends in compressed position rightwardly to engage another washer 136 held on rod 122 by nut 138 and an abutting jam nut 140. By this arrangement, the compression force in the springs 124 and 126 is imposed on the washers 132 and 134 in equal and opposite directions.

Disposed intermediate the washers 132 and 134 and mounted on the rod 122 is a lever rod guide 141. The lever rod guide has an aperture 142 therethrough so as to easily receive the rod 122. A pair of shoulders 143, 143 on the lever rod guide provides a convenient abutment surface for the washers 132 and 134 as they are resiliently urged into engagement therewith. A lever arm 144 extends upwardly from the lever rod guide 141 on this inner side and is pivotally attached to the lever rod guide by bolt 145 that is loosely received in an aperture 147 provided therein and threadedly received in an aperture 149 in the lever rod guide 141.

The lever arm 144 includes a clevis like portion at its upper end 148 so as to encompass and hold rigidly a shaft 154 extending from and journaled in the mounting plate 22 in an aperture 155 therein. A nut and bolt assembly 156 extends through the upper end 148 of the lever arm to insure that proper tightness is maintained between the shaft 154 and upper end of the lever arm 144 so that the shaft 154 is driven in a turning motion as the lower end of the lever arm 144 reciprocates due to the motion of the link 40.

Means for overriding the linkage 20 when the hydrostatic transmission is in forward position is provided by a hydraulic means 158. The hydraulic means 158 includes a housing 160 attached on or cast integrally with the mounting plate 22. Piston 162 of the hydraulic means 158 is sealed from atmosphere by a pair of O-rings 161 and moves outwardly by hydraulic pressure in the transmission which communicates with the cylinder 164 of the hydraulic means through a conduit 165 (FIG. 6). The working pressure of the hydrostatic means of course increases as stalling conditions are approached thereby impressing a larger force on the piston 162. To prevent stalling, piston 162 abuts against a portion 163 of the lever arm 144 to turn the said lever arm clockwise against the force of the spring 124 to override motion imparted to the swash plate 150 by the linkage 20 to thereby move the swash plate towards neutral position and reduce the flow of the working hydraulic fluid and prevent pump stall-out.

Extension 166 on housing 160 provides a positive stop for the lever arm 144 upon actuation of the linkage 20 to forward position under light load. Adjustable bolt 168 extending through a threaded aperture 170 in lever arm 144 provides an adjustable contact for engagement by this extension while nut 172 fixes the desired adjustment of the bolt 168. By this arrangement the swash plate 150 is positively limited in its clockwise movement and bottoming of the linkage 20 is prevented.

A positive stop is also provided to prevent movement of the swash plate too far in the reverse drive position of the transmission. This stop comprises a tab like element 174 fixed to the mounting plate 22, as for example, cast integrally therewith and disposed in a position to be abutted by the clockwise swinging of lever arm 144. A bolt 176 threaded in an aperture 178 in lever arm 144 provides an adjustable abutment on the lever arm for this stop and a nut 180 mounted on the bolt 176 fixedly places the desired adjustment of the bolt 176.

It should be noted that there is also an override function provided when the link 20 is in reverse drive position. When contact between the bolt 176 and tab like element 174 occurs, spring 126 is capable of compressing as the link 20 moves further into reverse position, thus providing increasing opening of the throttle so that additional power is available to the hydrostatic transmission. In a similar manner, overriding of the linkage 20 by the hydraulic means 158 in forward drive does not prevent advance of the throttle rod to a further full open position.

FIG. 6 illustrates schematically the relationship of the instant invention to an engine or prime mover E and a hydrostatic transmission H which would be present in a wheeled vehicle employing the invention. The swash plate 150 is seen disposed between a pump P and a motor E of the hydrostatic transmission H so that pivoting thereof in opposite directions will provide a flow into that increases or decreases the supply of power in a forward or reverse direction to the vehicle. An engine E, such as a conventional gasoline engine, drives the pump P while the throttle lever 152 advances and retards the output of the engine E through the throttle rod 111.

It is to be understood that the foregoing disclosure is merely illustrative of a preferred embodiment of the invention and that the scope of the same is not to be limited thereby but is to be determined by the appending claims.

What is claimed is:

1. In a shift and throttle control arrangement for a hydraulic transmission including a fluid motor and pump the combination comprising: (a) actuation means pivotally movable in opposite directions for imparting forward and reverse direction to said hydraulic transmission, (b) drive means attached to said actuation means and movable thereby in a generally reciprocating motion, (c) linkage means attached to said drive means for controlling a swash plate of said hydrostatic pump to provide forward and reverse outputs thereof, (d) hydraulically actuated means controlled by the pressure of said hydrostatic transmission to move said swash plate in opposition to said linkage means in at least one direction, and (e) said linkage means including means for continuously moving said throttle to an advance direction whenever said hydrostatic transmission is placed in reverse or forward drive.

2. In a shift control arrangement for use with a swash plate of a hydraulic transmission, the combination comprising: (a) manual actuating means, (b) a linkage assembly actuated in a fore and aft direction by said manual actuating means, (c) a reciprocating driven means pivotally attached to said linkage assembly, (d) a swash plate connecting means slidably mounted on said driven means, (e) a resilient means interposed between said connecting means and said linkage assembly, and (f) means responsive to increasing pressure in said hydraulic transmission for overriding said resilient means whereby said swash plate is moved to a non-stall condition.

3. In a shift and throttle control arrangement for a hydraulic transmission and engine therefor the combination comprising: (a) actuating means pivotally movable in opposite directions for imparting forward or reverse direction to said hydraulic transmission, (b) drive means attached to said actuating means and movable thereby in a generally reciprocating motion, (c) a first link means pivotally attached to said drive means, (d) first and second pivot means for pivotally mounting said first link means for rotation in opposite directions, (e) a second link means, (f) third pivot means for mounting said second link for rotation in one direction, (g) fourth pivot means pivotally connecting said first and second link means for driving rotation of said second link in said one direction, (h) first driven means pivotally attached to said first link for actuating a swash plate of said hydraulic transmission in forward and reverse directions, (i) second driven means attached to said second link means for advancing a throttle element of said engine as said swash plate is moved into forward and reverse positions, (j) overriding means mounted adjacent to said link means, and (k) said overriding means urging said swash plate to a non-stall position in opposition to movement of said first link means.

4. The combination set out in claim 3 wherein said first driven means includes resilient means interposed between said swash plate and said first link.

5. The combination set out in claim 4 wherein said overriding means moves at least a portion of said resilient means in a compressive direction when moving said swash plate into non-stall position.

6. The combination set out in claim 5 wherein said overriding means comprises hydraulic means actuated by increasing pressure of said hydraulic transmission.

7. The combination set out in claim 6 wherein sliding means are provided on said driving means interposed between said resilient means and said overriding means.

8. In a shaft and throttle control arrangement for a hydraulic transmission and prime mover the combination comprising: (a) operating means movable in opposite directions, (b) forced transfer means connected to said operating means and driven thereby, (c) first and second link means pivotally attached to said forced transfer means, (d) driven means attached to one of said first and second link means, (e) said driven means including resilient means, and (f) link overriding means for actuating against said resilient means thereby preventing stall-out of said hydraulic transmission.

9. In a shaft and throttle arrangement for a hydraulic transmission and prime mover, the combination comprising: (a) operating means movable in at least one direction, (b) forced transmitting means connected to said operating means, (c) link means operatively connected to said forced transfer means, (d) driven means operatively connected to said link means, (e) said driven means including resilient means mounted for movement therewith, and (f) link overriding means for moving against the movement of said resilient means in at least one direction for preventing stall-out of said hydraulic transmission.

10. The combination set out in claim 9 wherein said driven means includes: (a) a rod means movable in a fore and aft direction, and (b) said resilient means is mounted in encompassing relation on said rod means.

11. The combination set out in claim 10 wherein: (a) said link means comprises first and second links, and (b) said second link rotates clockwise in response to pivoting movement of said first link in a clockwise or counterclockwise direction.

References Cited

UNITED STATES PATENTS

| | | | |
|---|---|---|---|
| 2,774,436 | 12/1956 | Ferris | 60—19 XR |
| 3,003,309 | 10/1961 | Bowers et al. | 60—19 |
| 3,213,617 | 10/1965 | Hallberg | 60—53 |
| 3,213,618 | 10/1965 | Cadiou | 60—52 XR |

EDGAR W. GEOGHEGAN, *Primary Examiner.*